United States Patent
Mlinar et al.

(10) Patent No.: US 6,634,539 B2
(45) Date of Patent: Oct. 21, 2003

(54) ADJUSTABLE-GAP ROTARY ULTRASONIC HORN MOUNTING APPARATUS AND METHOD FOR MOUNTING (75) Inventors: John R. Mlinar, Coon Rapids, MN (US); Donald S. Oblak, North St. Paul, MN (US)

(73) Assignee: 3M Innovative Properties Company, St. Paul, MN (US)

(*) Notice: Subject to any disclaimer, the term of this patent is extended or adjusted under 35 U.S.C. 154(b) by 0 days.

(21) Appl. No.: 09/961,023

(22) Filed: Sep. 21, 2001

(65) Prior Publication Data

US 2003/0057259 A1 Mar. 27, 2003

(51) Int. Cl.⁷ .............................. B23K 5/20; B23K 1/06; B23K 20/10; B23K 31/00
(52) U.S. Cl. .................... 228/110.1; 228/1.1; 156/73.1; 156/580.1; 156/580.2
(58) Field of Search ................ 228/110.1, 1.1; 156/73.1, 73.2, 580.1, 580.2

(56) References Cited

U.S. PATENT DOCUMENTS

| | | | | |
|---|---|---|---|---|
| 3,683,736 A | * | 8/1972 | Loose | 264/154 |
| 3,955,740 A | | 5/1976 | Shoh | |
| 4,313,778 A | | 2/1982 | Mims | |
| 4,400,224 A | * | 8/1983 | Arai et al. | 148/242 |
| 4,400,227 A | | 8/1983 | Riemersma | |
| 4,517,790 A | * | 5/1985 | Kreager | 53/552 |
| 4,553,461 A | | 11/1985 | Belongia | |
| 4,647,336 A | | 3/1987 | Coenen et al. | |
| 4,650,530 A | * | 3/1987 | Mahoney et al. | 156/200 |
| 4,713,132 A | * | 12/1987 | Abel et al. | 156/73.1 |
| 4,804,131 A | * | 2/1989 | Cordemans de Meulenaer et al. | 228/1.1 |
| 4,884,334 A | | 12/1989 | Houser et al. | |
| 4,958,558 A | | 9/1990 | Harreither | |
| 5,059,277 A | * | 10/1991 | Willhite et al. | 156/580.1 |
| 5,144,711 A | | 9/1992 | Miwa | |
| 5,167,754 A | * | 12/1992 | Lutzow et al. | 156/324 |
| 5,364,005 A | | 11/1994 | Whelan et al. | |
| 5,411,195 A | | 5/1995 | Yamazaki et al. | |
| 5,421,924 A | * | 6/1995 | Ziegelhoffer et al. | 156/73.1 |
| 5,443,240 A | | 8/1995 | Cunningham | |
| 5,595,328 A | | 1/1997 | Safabakhsh et al. | |
| 5,603,445 A | | 2/1997 | Hill et al. | |
| 5,605,026 A | * | 2/1997 | Schott et al. | 156/580.2 |
| 5,660,679 A | * | 8/1997 | Rajala et al. | 156/580.1 |
| 5,749,987 A | | 5/1998 | Wannebo | |
| 5,775,055 A | | 7/1998 | Giacomelli et al. | |
| 5,817,199 A | * | 10/1998 | Brennecke et al. | 156/200 |
| 5,976,316 A | * | 11/1999 | Mlinar et al. | 156/580.1 |
| 6,085,489 A | * | 7/2000 | Bachner et al. | 156/580.2 |
| 6,099,670 A | | 8/2000 | Louks et al. | |
| 6,120,629 A | | 9/2000 | Shannon et al. | |
| 6,123,792 A | * | 9/2000 | Samida et al. | 156/290 |
| 6,287,403 B1 | * | 9/2001 | Couillard et al. | 156/290 |
| 6,368,437 B1 | * | 4/2002 | Ziegelhoffer et al. | 156/308.4 |
| 6,454,890 B1 | * | 9/2002 | Couillard et al. | 156/580.2 |
| 6,547,903 B1 | * | 4/2003 | McNichols et al. | 156/64 |
| 2002/0062900 A1 | * | 5/2002 | Couillard et al. | 156/73.1 |
| 2002/0062903 A1 | * | 5/2002 | Couillard et al. | 156/580.1 |

FOREIGN PATENT DOCUMENTS

| | | |
|---|---|---|
| DE | 2928360 | 1/1981 |
| GB | 2243092 A | 10/1993 |
| JP | 267130 A2 | 9/2000 |

* cited by examiner

Primary Examiner—Tom Dunn
Assistant Examiner—L. E. Edmondson (57) ABSTRACT

The invention is an apparatus comprising an ultrasonic horn. The horn is mounted to a support structure and includes a first mounting surface. An anvil is mounted to the support structure and spaced from the ultrasonic horn. The anvil has a first bearer surface. A bearer assembly supportably links the first mounting surface to the first bearer surface.

24 Claims, 8 Drawing Sheets

ADJUSTABLE-GAP ROTARY ULTRASONIC HORN MOUNTING APPARATUS AND METHOD FOR MOUNTING

BACKGROUND OF THE INVENTION

The present invention relates to ultrasonic horns. More particularly, the present invention relates to mounting an ultrasonic horn.

In ultrasonic welding (sometimes referred to as "acoustic welding"), two parts to be joined (typically thermoplastic parts) are placed directly below a tool called an ultrasonic "horn" for delivering vibratory energy. These parts (or "workpieces") are constrained between the horn and an anvil. The horn transfers energy to the welded part by expanding and contracting with the application of ultrasonic energy, typically from between approximately 20,000 hertz to approximately 40,000 hertz. An ultrasonic type vibratory welding system basically comprises an electrical generating means, an electrical ultrasonic converter for converting electrical energy into vibratory energy, the horn for delivering the vibratory energy into the weld zone, and an assembly for applying a static force to the workpieces so as to hold the workpiece in forced contact with the tool. The energy is imparted from the tool to the workpiece at a selected wavelength, frequency, and amplitude. The ultrasonic horn is an acoustical tool made of, for example, aluminum or titanium that transfers the mechanical vibratory energy to the part.

One type of ultrasonic welding is continuous ultrasonic welding. This type of ultrasonic welding is typically used for sealing fabrics and films, or other workpieces which can be formed into a "web" and fed through the welding apparatus. In continuous welding, the ultrasonic horn is typically stationary and the part is moved beneath it. One type of continuous ultrasonic welding uses a rotationally fixed bar horn and a rotationally fixed anvil surface. The workpiece is pulled between the bar horn and the anvil. The horn typically extends longitudinally towards the workpiece and the vibrations travel axially along the horn into the workpiece. In another type of continuous ultrasonic welding, the horn is a rotary type which is cylindrical and rotates about a longitudinal axis. The input vibration is in the axial direction of the horn and the output vibration is in the radial direction of the horn. The horn is placed close to an anvil which typically is also able to rotate so that the workpiece to be welded (or bonded) passes between the cylindrical surfaces at a linear velocity which substantially equals the tangential velocity of the cylindrical surfaces. This type of ultrasonic welding system is described in U.S. Pat. No. 5,976,316, incorporated by reference in its entirety herein.

The juxtaposition of the anvil to the horn allowed a static force to be provided to the workpiece, allowing the transmission of the ultrasonic energy to the workpiece. This static force was typically maintained by providing a pinching force to the workpiece from a force application system (e.g., using a fluid hydraulic system) which forced the horn radially towards the longitudinal axis of the anvil. The problem with this method of securing the workpiece was that when the workpiece being welded became extremely thin, or contained holes, the horn and the anvil could physically contact each other. When the horn contacted the anvil, a large spike in energy consumption occurred through the system, similar to an electrical short circuit. As throughput speeds of the workpiece were increased, the level of energy introduced through the horn was also increased, causing the frequency of the surges of energy which occurred during contact of the horn and anvil to exponentially increase. These high spikes of energy forced the machine into an overload condition causing it to shut down as well as potentially causing holes or brittle spots to be generated in the product. Thus, the amount of energy which could be introduced through the ultrasonic horn was limited in order to prevent the machine from entering into an overload condition. Consequently, the throughput speed of the workpiece or product had to be reduced to allow enough energy to be transferred to the workpiece to generate an adequate weld. In short, the process became inefficient and caused product damage when the horn and anvil contacted one another.

To remedy this problem, ultrasonic welding systems were developed which maintained a gap between the anvil and the horn. This gap was typically narrower than the thickness of the workpiece. The necessity to provide a pinching (or holding) force on the product, while maintaining a separation between the horn and the anvil, required a large and stiff support structure for both the horn and anvil. The support structure was necessarily rigid, to maintain the angular position of both the horn and the anvil with respect to each other. Mis-aligning the surfaces of the horn and anvil caused poor welding and loss of product. Similarly, attempting to adjust the distance of the gap in this type of system allowed an unacceptable level of movement to be introduced into the system, once again causing mis-adjustment of the surfaces of the horn and anvil. It is desirable, therefore, to provide a way to mount an ultrasonic horn next to an anvil so that a gap is maintained between the horn and the anvil, while maintaining the angular position of the horn with respect to the anvil, without requiring an overly large support structure.

BRIEF SUMMARY OF THE INVENTION

The invention includes an apparatus comprising an ultrasonic horn. The horn is mounted to a support structure and includes a first mounting surface. An anvil is mounted to the support structure and spaced from the ultrasonic horn. The anvil has a first bearer surface. A bearer assembly supportably links the first mounting surface to the first bearer surface.

Another aspect of the invention includes a method for mounting an ultrasonic welding horn comprising securing the ultrasonic horn to a support structure. The horn has a welding surface and a first mounting surface. An anvil having a pressing surface and a first bearing surface is disposed such that the pressing surface is proximate to the welding surface. The welding surface and the pressing surface are biased towards each other. A linkage structure links the first bearing surface to the first mounting surface so as to prevent the pressing surface and the welding surface from coming into contact.

BRIEF DESCRIPTION OF THE DRAWINGS

The present invention will be further explained with reference to the drawing figures referenced below, wherein like structure is referred to by like numerals throughout the several views.

It should be noted that certain portions of the invention may be illustrated as out of proportion with other portions in order to clearly illustrate various aspects of the invention.

FIG. 5 is a cross-sectional view of the bearer assembly. While the above-identified drawings set forth one preferred embodiment, other embodiments of the present invention are also contemplated, as noted in the discussion. This disclosure presents an illustrative embodiment of the present invention by the way of representation and not limitation. Numerous other modifications and embodiments can be devised by those skilled in the art which fall within the scope and spirit of the principles of this invention.

DETAILED DESCRIPTION

Figure 1:
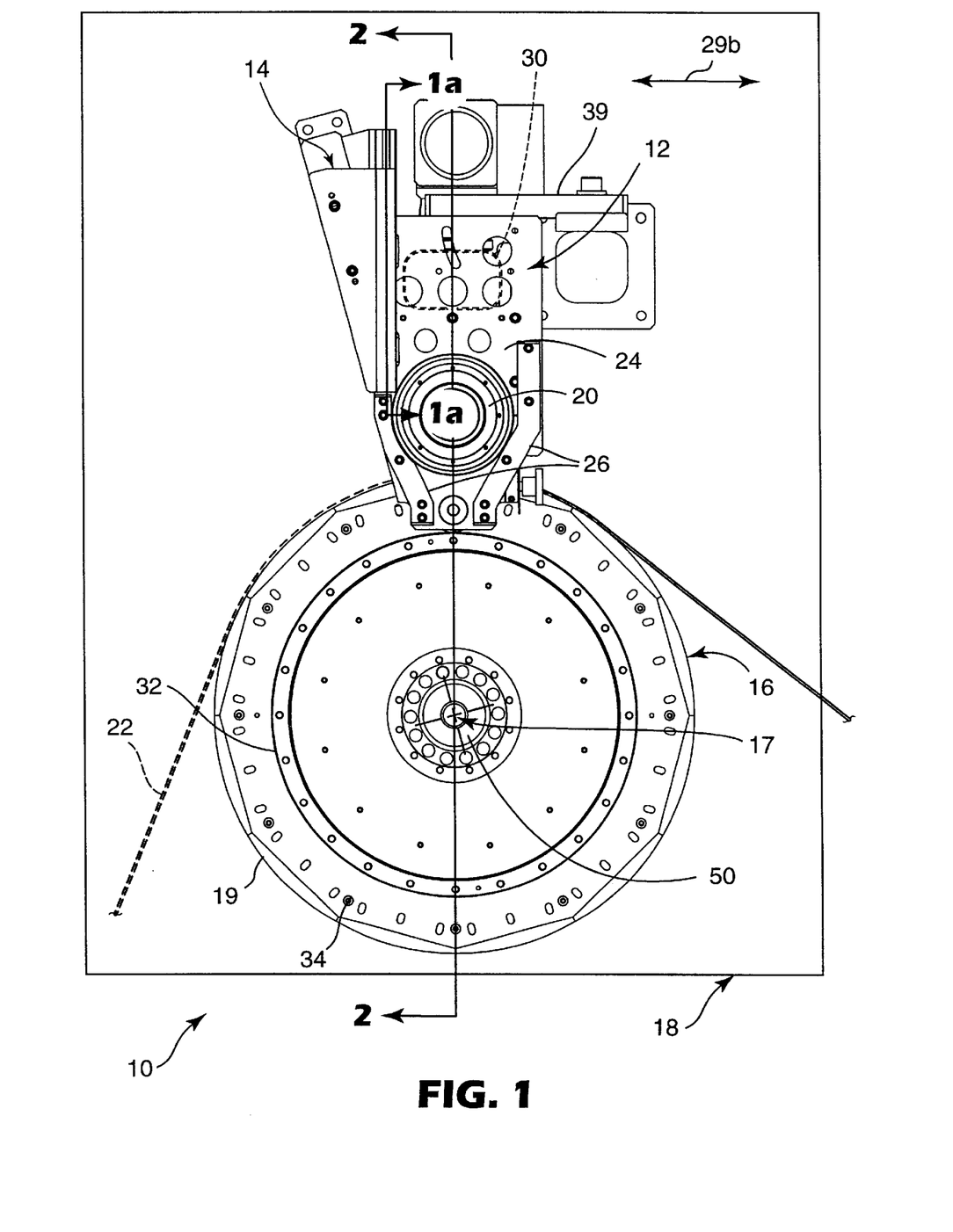
FIG. 1 is an elevational view of an ultrasonic welding system.

One embodiment of an ultrasonic welding device is illustrated at 10 in FIG. 1. Ultrasonic welding device 10 includes at least one horn assembly 12, horn assembly guide 14, anvil roll 16 having longitudinal axis 17 (shown running into the page in FIG. 1) and mounting plate 18.

Horn assembly guide 14 and anvil roll (or anvil, or roll) 16 are mounted to mounting plate 18 so as to dispose ultrasonic horn 20 included in horn assembly 12 proximate to anvil roll 16. In operation, web 22 (shown in dotted lines before being welded and solid lines after welding) is threaded through welding device 10 so as to ride on axially extending pressing surface 19 of anvil roll 16 between pressing surface 19 and ultrasonic horn 20. While one horn assembly 12 is illustrated, any number may be utilized without departing from the spirit and scope of the invention. Faceplates 24 are provided for structural support of horn assembly 12, and may include stiffening braces 26.

Pressure system 30 (shown in dotted lines in FIG. 1) is included with horn assembly 12 to drive the ultrasonic horn 20 radially inward towards the anvil roll 16. In an alternate embodiment, a pressure system could be used to drive the anvil towards the longitudinal axis of the horn, or simultaneously drive the horn and anvil towards each other. This pressure system can utilize any number of methods to generate force, including utilizing pneumatic, mechanical (e.g., gear driven, screw jack), or electronic apparatus, as would be known to one skilled in the art.

Figure 1A:
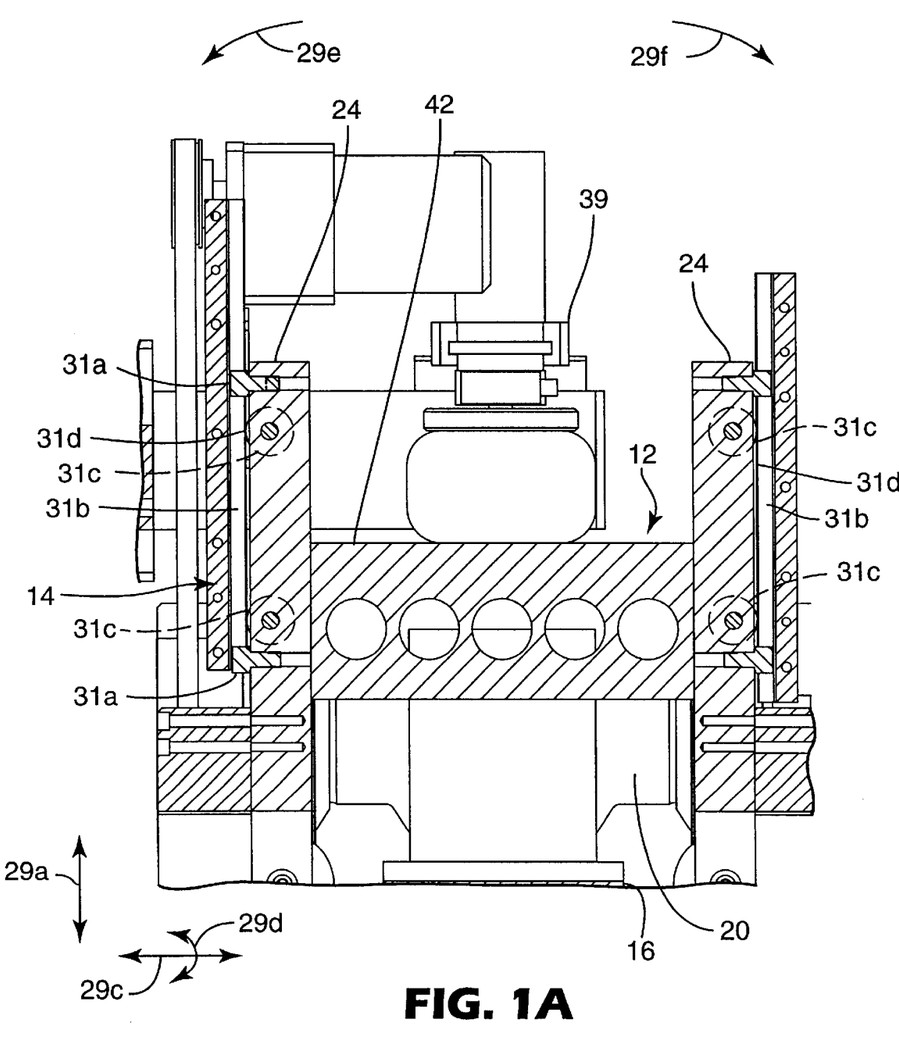
FIG. 1A is a cross-sectional view of a guide portion of an ultrasonic welding system, as taken along line 1A—1A of FIG. 1.

Ultrasonic horn 12 is allowed to translate radially inward along tracks (or grooves) 31b in horn assembly guide 14, as shown in FIG. 1A. A person skilled in the art would realize the illustrated apparatus is exemplary of one way to allow the radially inward movement of each ultrasonic horn 20 with respect to anvil roll 16 and that any number of methods may be used. In the embodiment shown, cam followers 31a are secured to each horn assembly 12 and are inserted into grooves 31b in horn assembly guide 14. The relation of cam followers 31a in grooves 31b allows horn assembly 12 (including horn 20) to translate radially toward and away (arrow 29a) from anvil 16. Cam followers 31a and grooves 31b prevent horn assembly 12 from moving transversely (into and out of the page when viewing FIG. 1A and in the direction of arrow 29b in FIG. 1). Translation of horn assembly 12 in an axial direction shown by arrow 29c is limited by a series of individual bearings 31c, which abut stop surfaces 31d on horn assembly guide 14. Rotation of horn assembly 12 about the axis defined by arrow 29c is also prevented by cam followers 31a. A slight amount of clearance is provided between inner wall 31e of grooves 31b and cam followers 31a, allowing each horn assembly 12 to rotate along the longitudinal direction (arrows 29e and 29f) about axis 29b (see FIG. 1). Stop surfaces 31d limit this longitudinal rotation of horn assembly 12.

Figure 2:
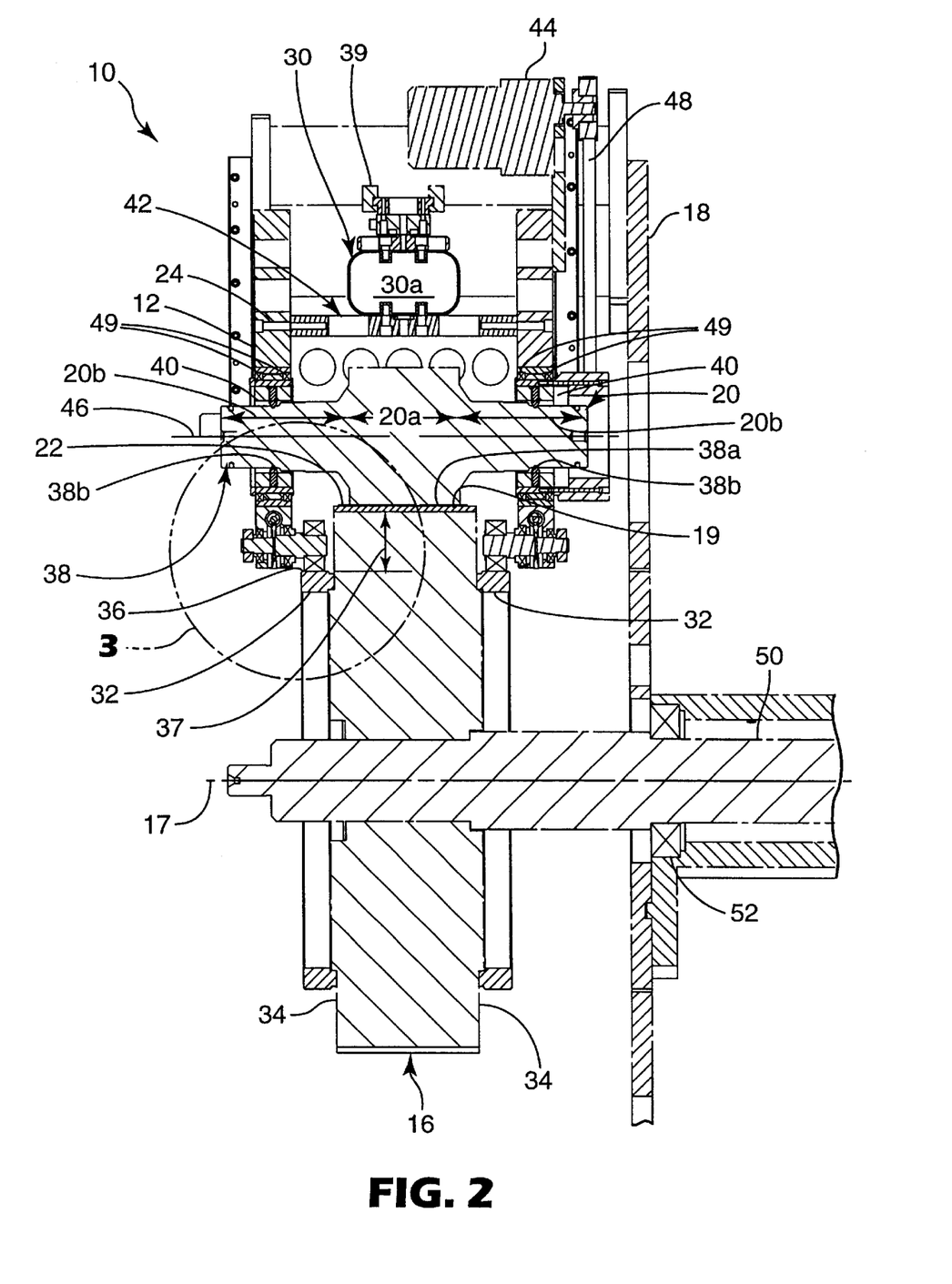
FIG. 2 is a cross-sectional view taken along line 2—2 of FIG. 1.

Bearer rings 32 are included as part of anvil roll 16, and are mounted on radially extending faces 34 of anvil roll 16 (e.g., by bolting, welding, etc.). Bearer rings 32 are concentric with anvil roll 16, as best shown in FIG. 2. FIG. 2 illustrates a cross-section taken through horn assembly 12 and is representative of any horn assembly mounted according to the present invention.

Bearing rings 32 extend axially from radially extending faces 34 of anvil roll 16, forming axially extending bearer surfaces 36. Anvil roll 16 is machined such that pressing surface 19 of anvil roll 16 and bearer surface 36 of bearer rings 32 each are substantially concentric to longitudinal axis 17 of anvil roll 16. Additionally, the radial distance (indicated by reference number 37 in FIG. 2) between the pressing surface 19 and the bearer surface 36 is maintained at a substantially constant distance, preferably at approximately 3.169 inches (80.493 mm), regardless of the rotational position of anvil 16. While the illustrated embodiment shows bearer surface 36 radially spaced from pressing surface 19, it should be understood that bearer surface 36 could be placed anywhere on anvil roll 16 (or on any part of the assembly making up the anvil roll, such as bearer rings 32) with respect to pressing surface 19.

Although the exact configuration of the ultrasonic horn may be one of several designs known in the art, in one embodiment, horn 20 includes welding portion 20a and mounting (or shaft) portions 20b. Outer surface 38 of horn 20 can similarly be divided into welding surface 38a and mounting (or bearer) surfaces 38b. While the illustrated embodiment shows mounting surfaces 38b disposed longitudinally on both sides of the welding surface 38a, it should be understood that mounting surfaces may be disposed anywhere on horn 20. Additionally, any number of mounting surfaces may be used. As web 22 is fed through ultrasonic welding device 10, it passes between welding surface 38a of horn 20 and pressing surface 19 of anvil roll 16 (which typically has various surface protrusions, as is known to one skilled in the art) transferring the ultrasonic energy from horn 20 to web 22 as it is pinched between horn 20 and anvil 16, thereby welding web 22. Pressure system 30 maintains a constant force on horn assembly 12, providing a compressive (pinching) force on web 22 by pushing horn frame 42 (and thus horn 20) radially inward towards anvil roll 16.

Horn frame 42 is part of horn assembly 12 and is secured to mounting plate 18 to provide structural support to the horn assembly 12. In one embodiment, pressure system 30 utilizes an air filled bladder 30A to direct horn 20 radially inward towards anvil 16. One side of bladder 30A is mounted to horn frame 42, and the other side of bladder 30a is mounted to support 39. Support 39 extends transversely (out of the page when viewing FIG. 2) across welding apparatus 10 and then in the axial direction (as defined by longitudinal axis 17) where it is secured to mounting plate 18. As air (or other fluid) is introduced into bladder 30A, it expands, pressing against support 39 and horn frame 42, forcing horn assembly 12 towards anvil 16.

Figure 3A:
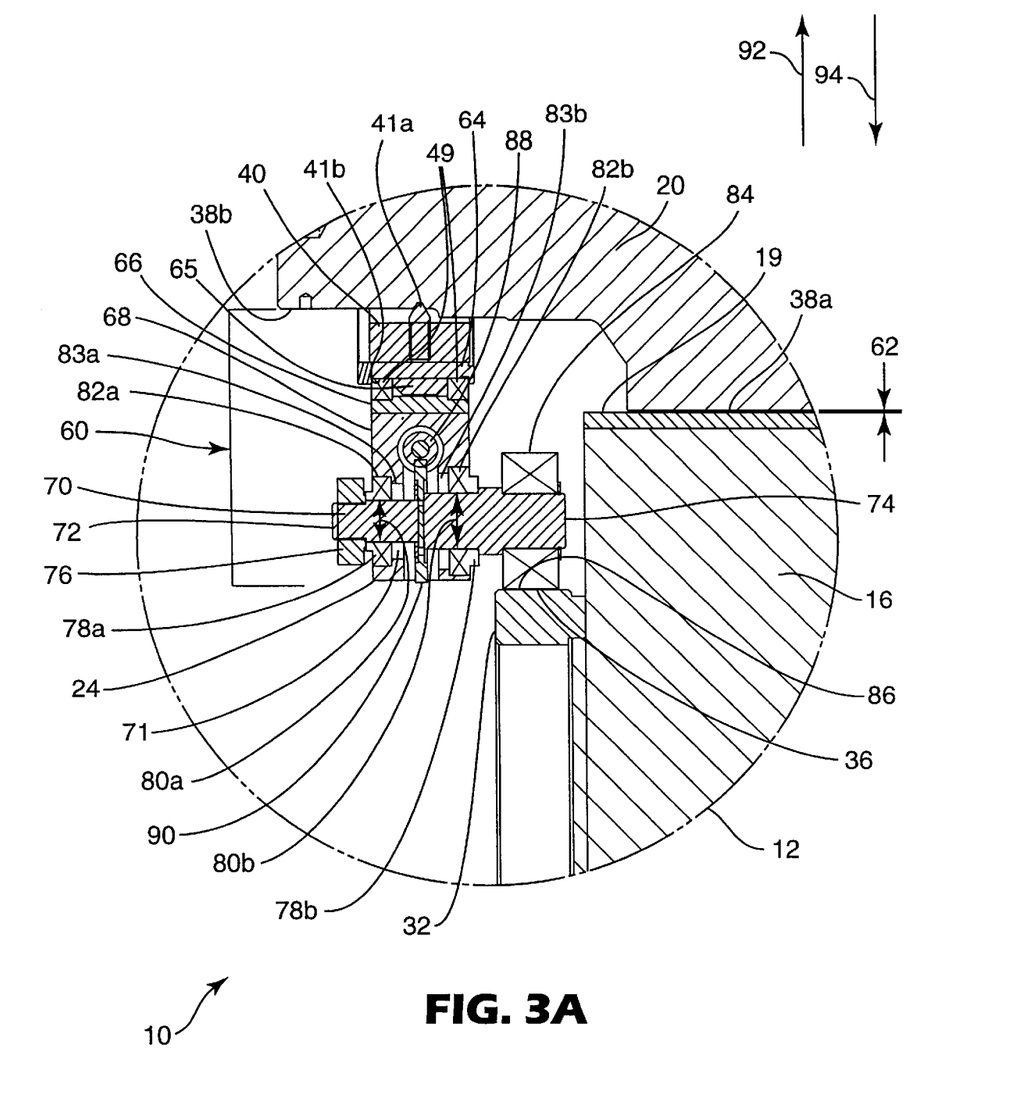
FIG. 3A is a detailed view of the area indicated by reference number 3 in FIG. 2.
Figure 3B:
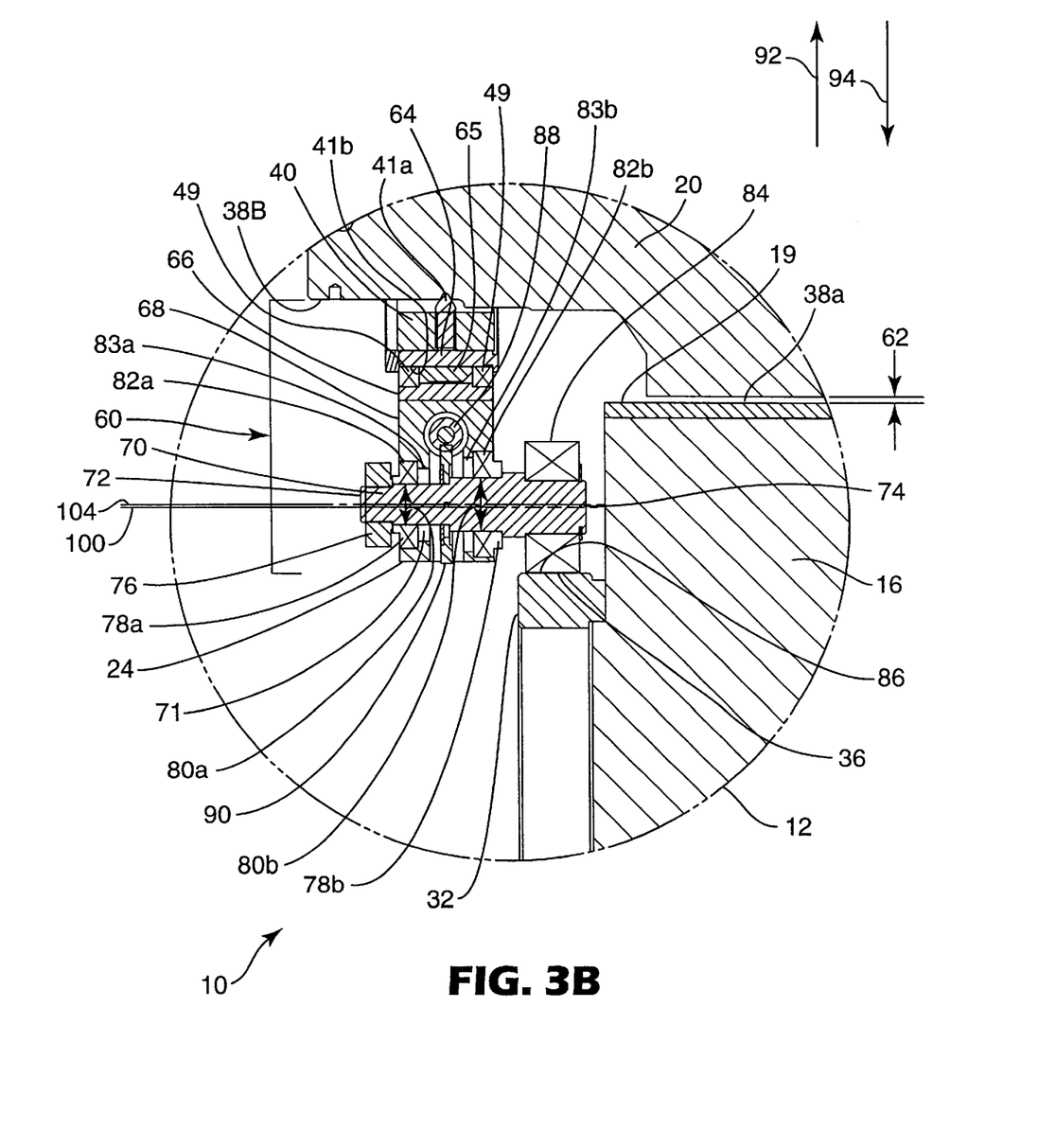
FIG. 3B is the same view as FIG. 3A, but with a larger gap between the welding surface of the horn and the pressing surface of the anvil.

Isolating devices 40 are attached to shaft portions 20B of ultrasonic horn 20. Isolating devices 40 are used to isolate the vibrational energy of horn 20 from the remainder of horn assembly, including horn frame 42 and faceplate 24. One type of isolation device is a set-screw type nodal mount as illustrated in FIGS. 2, 3A and 3B. Set-screw nodal mounts are adjustable and allow for a wide variety of materials to be used in web 22. Other types of isolation devices, however, may be preferable in certain applications and may be used in the inventive system without departing from the spirit and scope of the invention. Examples of other types of isolating devices include but are not limited to nodal mounts such as those disclosed in U.S. Pat. No. 5,603,445 (Hill et al.), U.S. Pat. No. 4,804,131 (Cordemans de Meulenaer et al.), U.S. Pat. No. 5,595,328 (Safabakhsh et al.), U.S. Pat. No. 5,443,240 (Cunningham), U.S. Pat. No. 5,364,005 (Whelan et al), U.S. Pat. No. 4,647,336 (Coenen et al.), U.S. Pat. No. 5,411,195 (Yamazaki et al.), British Patent GB 2,243,092A and German Patent DE 2,928,360 as well as non-nodal mounts, such as those disclosed in U.S. Pat. No. 5,976,316 (Mlinar et al.), U.S. Pat. No. 4,884,334 (Houser et al.), U.S. Pat. No. 3,955,740 (Shoh), and Japanese Patent JP 4-267130. All of these patents are incorporated by reference in their entirety herein.

Gear motor 44 is mounted to horn frame 42 and is used to rotate horn 20 about horn longitudinal axis 46. Typically, gear motor 44 is interconnected to horn 20 through timing pulley 48. Horn bearings 49 are disposed circumferentially about isolating devices 40, allowing horn 20 and isolating devices 40 to rotate with respect to the remainder of horn assembly 12.

Anvil 16 is secured to mounting plate 18 by shaft 50 which extends through anvil 16 along longitudinal axis 17. Shaft 50 transfers torque to anvil 16 from a rotational source (not shown). Typically, the rotational speed of shaft 50 and gear motor 44 are synchronized so as to provide substantially the same tangential velocity at welding surface 38a of horn 20 and axially extending pressing surface 19 of anvil 16, so that drag on the workpiece material (i.e., web 22) is minimized. Shaft 50 is rotationally fixed with respect to anvil 16, and shaft bearing 52 is mounted between shaft 50 and mounting plate 18 to allow shaft 50 to be supported by mounting plate 18 while still allowing rotation of shaft 50 with respect to mounting plate 18.

As shown in FIG. 3A, bearer assemblies (or linkage structures) 60 provide a linkage between mounting surfaces 38b of horn 20 and bearer surfaces 36 on bearer rings 32. Bearer assembly 60 acts to isolate the energy resident in shaft portions 20b and mounting surfaces 38b of horn 20 from bearer surfaces 36 and bearer rings 32 of anvil roll 16. Additionally, bearer assembly 60 acts to supportably link mounting surface 38a of horn 20 and bearer surface 36 of anvil roll 16. By providing a supportive link directly between anvil roll 16 and horn 20, a pre-determined separation distance (or gap) 62 can be maintained between welding surface 38a of horn 20 and pressing surface 19 of anvil roll 16. In one embodiment, gap 62 is set between approximately 0.0025 inch (0.0635 mm) to approximately 1 inch (25.4 mm), depending upon the application. Note that in FIG. 3A, the web has been omitted so as to clearly illustrate gap 62. Additionally, it should be noted that bearer assembly 60 described with respect to FIG. 3A is representative of the other bearer assemblies previously illustrated.

As discussed previously, bearer assembly 60 includes isolating device 40 (having set-screw 41a) and horn bearings 49. To provide increased strength and stability in bearer assembly 60, first support ring 64 is disposed annularly about and press fit to outer face 41b of isolating device 40. Horn bearings 49 extend annularly about and are press fit onto first support ring 64. Bearing spacer 65 extends annularly about first support ring 64 and is disposed axially between horn bearings 49. Second support ring 66 extends annularly about horn bearings 49 and bearing spacer 65 and is press fit onto horn bearings 49. First and second support rings 64 and 66 in conjunction with bearing spacer 65 facilitate installation of horn bearings 49 into faceplate 24.

Eccentric shaft 70 extends transversely through aperture 71 in faceplate 24, in a direction parallel to the longitudinal axis of anvil 16 and horn 20. Eccentric shaft 70 includes non-anvil end 72 and anvil end 74. Eccentric shaft 70 is supported by first and second thrust bearings 78a and 78b disposed annularly about eccentric shaft 70 at first and second shaft diameters 80a and 80b. First and second thrust bearings 80a and 80b are seated within faceplate 24 and include annular rims 82a and 82b. Annular shoulders 83a and 83b are disposed internally in aperture 71 and abut about annular rims 82a and 82b, respectively. Threaded shaft collar 76 is preferably threaded on to non-anvil end 72 of eccentric shaft 70 to secure thrust bearings 78a and 78b in aperture 71. Thus, annular shoulders 83a and 83b in combination with thrust bearings 78a and 78b prevent the transverse movement of eccentric shaft 70 within aperture 71 while allowing rotation of eccentric shaft 70 within aperture 71. Cam follower bearing 84 is press fit annularly about anvil end 74 of eccentric shaft 70. Follower surface 86 of cam follower bearing 84 engages bearer surface 36 of bearer ring 32.

In operation, horn 20 (as part of horn assembly 12) is driven radially towards anvil 16 (FIGS. 3A and 3B), in the direction of arrow 94 by pressure system 30 (described previously with respect to FIGS. 1 and 2). Thus, faceplate 24, isolation device 40, first and second support rings 64 and 66, bearing spacer 65, horn bearings 49 thrust bearings 78a and 78b, eccentric shaft 70 and cam follower bearing 84 translate inward as well. Rotation of horn 20 is isolated from faceplate 24 by horn bearings 49. Ultrasonic vibrations are isolated from faceplate 24 by isolating device 40.

Since eccentric shaft 70 extends through faceplate 24 at aperture 71, downward force is translated through thrust bearings 78a and 78b, to eccentric shaft 70 and finally to cam follower bearing 84. Follower surface 86 of cam follower bearing 84 is translated inward until it engages bearer surface 36 of bearer ring 32, preventing further inward movement of cam follower bearing 84. Cam follower bearing 84 allows anvil 16 to rotate with respect to bearer assembly 60. Thus, following the same relational path backwards, once follower surface 86 of cam follower bearing 84 engages bearer surface 36 on anvil 16, horn assembly 12, including horn 20 is prevented from further movement in the direction of arrow 94.

The radial separation distance of the bearer assembly 60 (i.e., the distance between mounting surface 38b of horn 20 and bearer surface 36 of anvil 16) is set so that mounting surface 38b of horn 20 engages bearer surface 36 of anvil 16 before welding surface 38a of horn 20 engages pressing surface 19 of anvil. This allows radial forces to translate directly from horn assembly 12 to anvil 16 while still maintaining gap 62 (preventing contact) between welding surface 38a of horn 20 and pressing surface 19 of anvil.

Preventing the engagement of welding surface 38a and pressing surface 19, prevents the spiking of energy and subsequent overload of the welding device as well as preventing damage to the workpiece, as was discussed previously. Simultaneously, since horn 20 and anvil 16 are in continual engagement, the design of the support system of the welding device 10 as well as the pressure system 30 can be simplified. For example, since the horn 20 is allowed to translate inward until cam follower bearing 84 engages bearer ring 32, pressure system 30 can be set to provide a level of compressive force to web 22 well above any reactive force generated by variances in thickness of web 22 or by runout of horn 20 or anvil 16. Runout occurs when the horn or anvil is mounted such that rotation occurs about an axis slightly off center resulting in eccentric rotation. While the various components of the welding device 10 (e.g., bearing rings 32, horn 20, anvil roll 16) are typically machined to eliminate run out, slight variances can still occur. The ability to overcome these variances due to web thicknesses or slight eccentricities as well as the ability to maintain the predetermined distance when Aholes@ in the web would otherwise cause anvil 16 and horn 20 contact (thereby generating an overload condition) allows the welding device 10 to be run at a higher speed (i.e., the web is run at a higher throughput). Put another way, the inventive mounting system eliminates overload downtime as well as maintaining quality product output at higher web throughput than was attainable by previous ultrasonic welding devices.

Additionally, since compressive forces are being applied directly between the horn and the anvil, the support structure (i.e., mounting plate 18, shown previously) does not need to maintain the axial angular position of the horn relative to the anvil. Instead, this relative angular position is maintained by the bearer assemblies. As a consequence, the support structure for the horn and the anvil does not need to be built to provide a large amount of stiffness (assuring angular position) and can be reduced in size and in cost from that required in previous gap type ultrasonic welding systems.

Worm 88 and worm gear 90 (described further with respect to FIG. 5) allow eccentric shaft 70 to be rotated by an operator, forcing the bearer assembly 60 radially inward in the direction of arrow 94 or allowing the bearer assembly 60 to travel radially outward in the direction of arrow 92. When bearer assembly 60 is urged radially outward (direction 92) horn 20 is lifted at mounting surface 38b, causing gap 62 to widen. When cam follower bearing 84 is allowed to move radially inward (direction 94) pressure system 30 (previously described with respect to FIGS. 1 and 2) forces horn 20 radially inward (direction 94) to maintain follower surface 86 of cam follower bearing 84 against bearer surface 36 of bearer ring 32. The inward movement of horn 20 decreases the distance of gap 62, as illustrated in FIG. 3B.

Figure 4A:
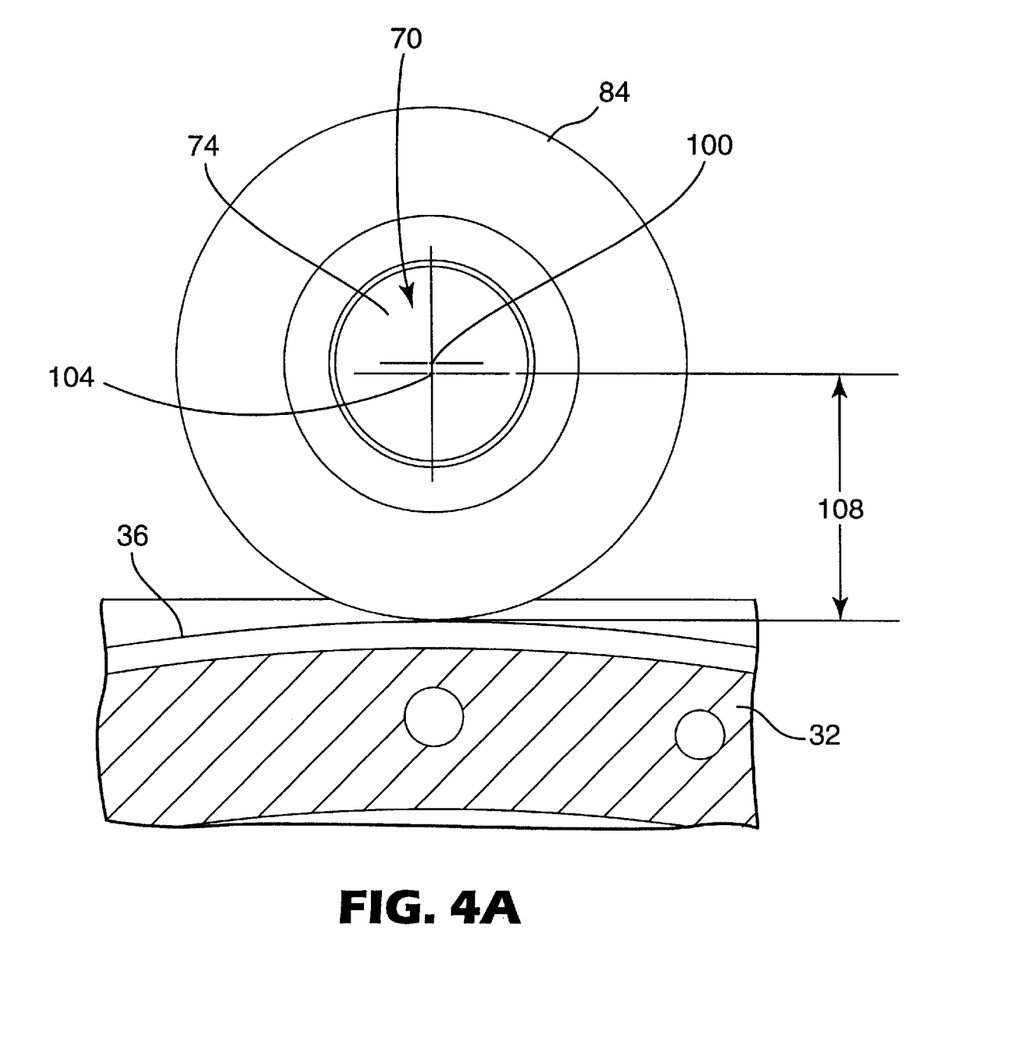
FIG. 4A is an elevational view of a portion of the bearer assembly taken from the anvil end of the eccentric shaft.

FIG. 4A is a view taken from anvil end 74 of eccentric shaft 70, illustrating the use of eccentric shaft 70 to translate the bearer assembly 60 radially inward or outward (i.e., "lengthen" or "shorten" the bearer assembly 10). As illustrated, eccentric shaft 70 has a central axis 100 disposed through the center of anvil end 74 (the eccentric end) of eccentric shaft 70 and a longitudinal axis 104 about which eccentric shaft 70 rotates. The distance between these axises is commonly referred to as the "eccentricity of the shaft." As illustrated, disposing eccentric shaft rotationally so as to position central axis 100 of anvil end (or eccentric portion) of eccentric shaft 70 radially outward from longitudinal (or rotational) axis 104 of shaft 70 defines a first distance 108 from bearer surface 36 of bearer ring 32 to longitudinal axis 104 of eccentric shaft 70.

Figure 4B:
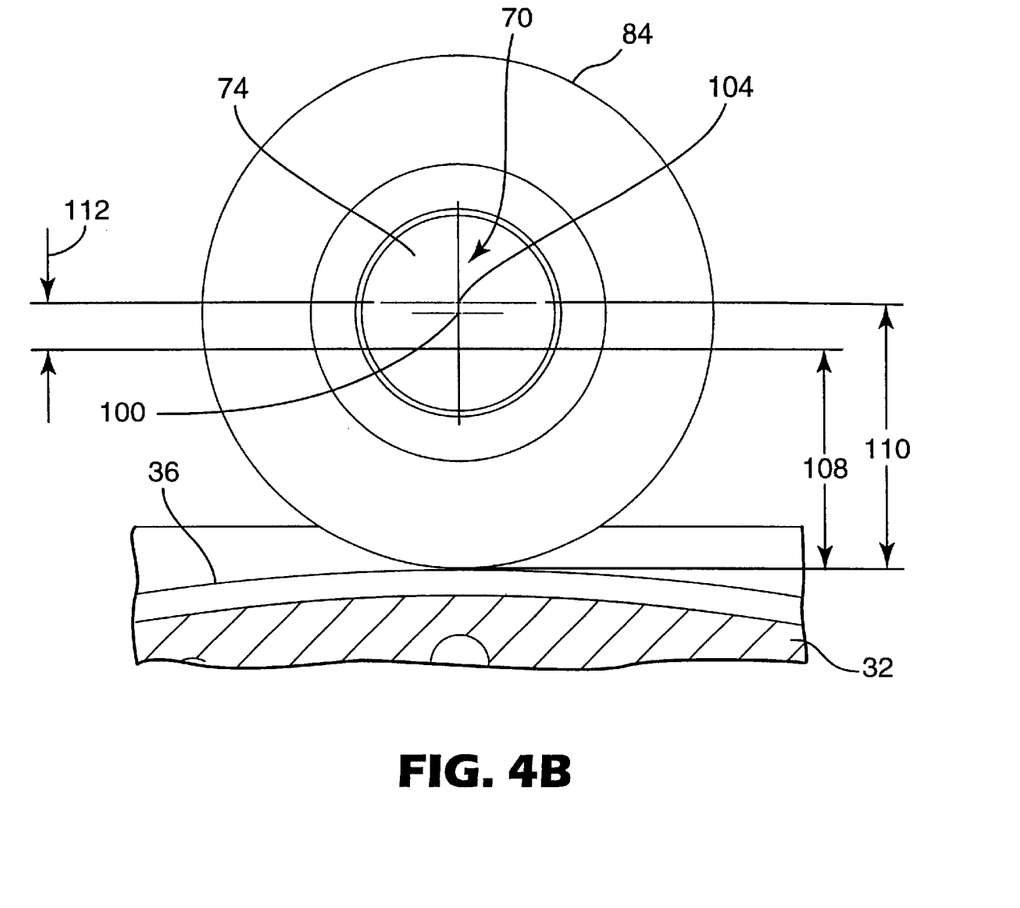
FIG. 4B is an elevational view of a portion of the bearer assembly taken from the anvil end of the eccentric shaft.

Eccentric shaft 70 can be rotated by the operator about longitudinal axis 104 until central axis 100 of eccentric shaft 70 is disposed generally radially inward from longitudinal axis 104 of shaft 70, as shown in FIG. 4B. Rotating eccentric shaft 70 in this manner defines a second larger distance 110 from bearer surface 36 of bearer ring 32 to longitudinal axis 104. It should become evident that by changing the rotational position of eccentric shaft 70, the distance between longitudinal axis 104 of eccentric shaft 70 and top surface 106 of bearer ring 32 can be varied from between first distance 108 (shown in FIG. 4A) and second distance 110 (shown in FIG. 4B). This distance can be defined as variable distance 112. Thus, the "length" of the bearer assembly 60, or in other words, the distance defined by bearer assembly 60 between mounting surface 38b of horn 20 and bearer surface 36 of anvil 16 can be varied. An operator is able to vary the length of bearer assembly 60 by rotating eccentric shaft 70, thereby changing the distance between horn 20 and anvil 16. This allows the operator to adjust the size of gap 62 (as previously discussed with respect to FIGS. 3A and 3B) while still continuously maintaining a supportive link between anvil 16 and horn 20. In this configuration, variable distance 112 is also the distance through which gap 62 can be adjusted and is also equal to twice the eccentricity of shaft 70.

Figure 5:
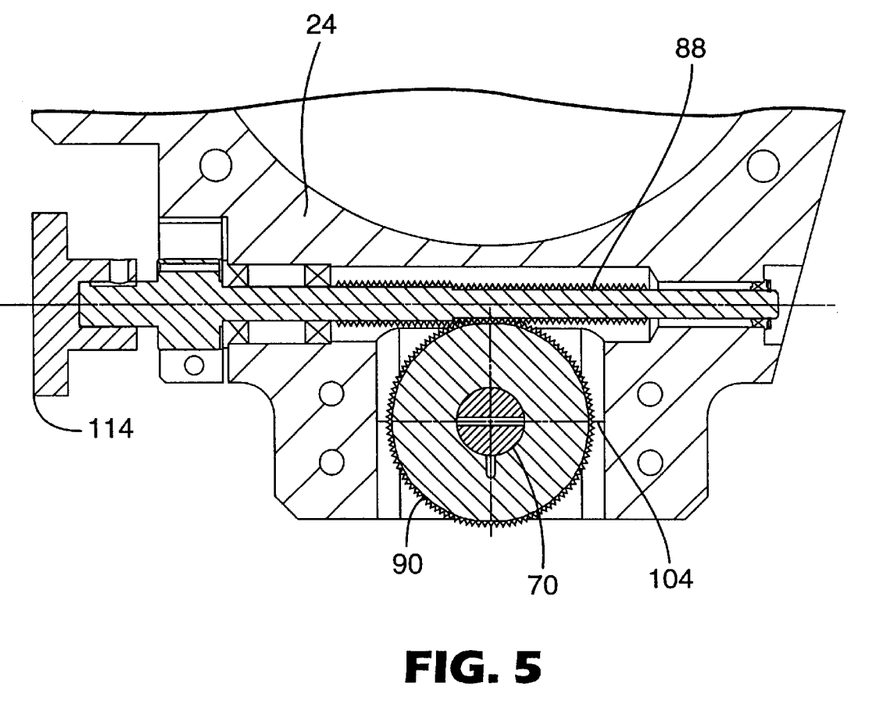

FIG. 5 illustrates worm 88 and worm gear 90 used in combination with eccentric shaft 70. Worm 88 preferably has knob 114 attached so as to allow an operator to easily grasp and rotate worm 88. Teeth on worm 88 engage mating teeth on worm gear 90. Worm gear 90 is press fit about or pinned to eccentric shaft 70 so that it is locked rotationally to eccentric shaft 70. By turning knob 114, ridges of worm 88 drive worm gear 90 and eccentric shaft 70 either clockwise or counterclockwise (as when viewing FIG. 5) depending on the direction knob 114 is rotated. Thus, the operator can adjust gap 62 without disassembling of the welding device 10. Adjusting the length of bearer assemblies 60 on opposite ends of horn 20 (as illustrated in FIG. 2) allows the operator to manually compensate for any variation in dimensions (i.e., due to machining tolerances, etc.) in horn 20 or anvil 16. In other words, the operator can slightly rotate the horn assembly 12 along its longitudinal axis (as discussed with respect to FIG. 1A) to adjust the angular relation of welding surface 38a of horn 16 with respect to pressing surface 19 of anvil 16.

While one adjustment embodiment has been discussed with respect to bearer assembly 60, it would be understood by a person skilled in the art that other adjustment methods could be used without departing from the spirit and scope of the invention (e.g., taper (wedge) blocks, replaceable shims, lever arms, differential screws, thermal expansion, etc.). In fact, the bearer assembly 60 can be reconfigured such that the apparatus utilized to adjust the length of the bearer assembly 60 contacts a surface on the horn, or in the middle of the bearer assembly versus directly contacting a surface on the anvil.

Additionally, although the invention was described with respect to a continuous welding process utilizing a rotary horn and anvil, other types of ultrasonic welding devices may be used without departing from the spirit and scope of the invention (e.g., scan welding using bar horns).

Although the present invention has been described with reference to preferred embodiments, workers skilled in the art will recognize that changes may be made in form and detail without departing from the spirit and scope of the invention.

What is claimed is:

1. An apparatus comprising:
   a support structure;
   an ultrasonic horn including a first mounting surface, the ultrasonic horn mounted to the support structure;

an anvil spaced from the ultrasonic horn, the anvil including a first bearer surface; and a first bearer assembly supportably linking the first mounting surface to the first bearer surface, the first bearer assembly configured to adjustably establish a fixed minimum gap between the horn and the anvil during rotation of one of the horn and anvil relative to the other of the horn and anvil.

2. The apparatus of claim 1, wherein the first bearer assembly is adjustable in length.

3. The apparatus of claim 1, and further comprising:

a force generating apparatus disposed so as to translate the ultrasonic horn in the direction of the anvil.

4. The apparatus of claim 1, wherein the horn is annular in shape and is rotatable about a longitudinal axis.

5. The apparatus of claim 1, wherein the anvil is annular in shape and is rotatable about a longitudinal axis.

6. The apparatus of claim 5 wherein the anvil further comprises:

an axially extending pressing surface; and a bearer ring secured in fixed relation to the anvil, wherein the bearer surface is disposed on the bearer ring.

7. The apparatus of claim 1, wherein the first bearer assembly further includes:

an isolating device secured to the first mounting surface;

an annular horn bearing disposed coaxially with respect to the isolating device;

a cam follower bearing including a follower surface disposed proximate to one of the first mounting surface and the first bearer surface such that the follower surface is engagable with one of the first mounting surface and the first bearer surface; and an eccentric shaft supportably linking the annular horn bearing and the cam follower bearing.

8. The apparatus of claim 7, and further comprising:

a welding surface disposed on the ultrasonic horn;

a pressing surface disposed on the anvil; and wherein rotating the eccentric shaft varies the distance between the welding surface and the pressing surface.

9. The apparatus of claim 1 and further comprising:

a welding surface disposed annularly about the ultrasonic horn; and an axially extending pressing surface disposed annularly about the anvil and more proximate to the welding surface than the first bearer surface.

10. The apparatus of claim 1 and further comprising:

a second mounting surface and a welding surface disposed on the ultrasonic horn, wherein the welding surface is disposed between the first mounting surface and the second mounting surface;

a second bearer surface and a pressing surface disposed on the anvil, wherein the pressing surface is disposed between the first bearer surface and the second bearer surface; and a second bearer assembly supportably linking the second mounting surface to the second bearer surface.

11. The apparatus of claim 10, wherein the second bearer assembly is adjustable in length.

12. The apparatus of claim 12, wherein the first bearer assembly isolates ultrasonic energy from the second bearer surface.

13. The apparatus of claim 1, wherein at least one of the horn or anvil translates with respect to the other of the horn or anvil.

14. The apparatus of claim 1 and comprising:

a plurality of ultrasonic horns.

15. An ultrasonic welding apparatus comprising:

a support structure;

an annular rotatable ultrasonic horn including a welding surface and a mounting surface, wherein the ultrasonic horn is mounted to the support structure;

an annular rotatable anvil spaced from the ultrasonic horn, the anvil including a pressing surface and an annular bearer ring having a bearer surface;

a force generating apparatus disposed so as to bias the welding surface towards the axially extending pressing surface;

an isolating device disposed annularly about and in supportive engagement with the mounting surface;

a horn bearing disposed annularly about and in supportive engagement with the isolating device;

a cam follower bearing including a follower surface disposed proximate the bearer surface, wherein the follower surface is engagable with the bearer surface; and a shaft supportably linking the annular horn bearing and the cam follower bearing.

16. The apparatus of claim 15, wherein the welding surface and the outer surface are biased together by the force generating apparatus until reaching a pre-determined separation distance.

17. A method for mounting an ultrasonic welding horn comprising:

securing the ultrasonic horn, having a welding surface and a first mounting surface, to a support structure;

disposing an anvil having a pressing surface and a first bearing surface such that the pressing surface is proximate to the welding surface;

biasing the welding surface and the pressing surface towards each other;

linking the first bearing surface to the first mounting surface with a linkage structure so as to prevent the pressing surface and the welding surface from coming into contact, forming a predetermined separation distance.

18. The method of claim 17 and further comprising:

adjusting the pre-determined separation distance by changing the first linkage structure length.

19. The method of claim 17 and further comprising:

linking a second bearer surface disposed on the anvil with a second mounting surface disposed on the horn by using a second linkage structure.

20. The method of claim 19 and further comprising:

adjusting the spatial separation distance by changing the first linkage structure length and the second linkage structure length.

21. The method of claim 17 and further comprising:

providing a rotational connection between the horn and the support structure.

22. A method for ultrasonic welding comprising:

rotating an ultrasonic horn having a welding surface and a first mounting surface;

rotating an anvil having a pressing surface and a first bearer surface such that the pressing surface is proximate and substantially parallel to the welding surface;

biasing the welding surface and the pressing surface towards each other;

utilizing a first linkage structure between the first mounting surface and the first bearer surface to prevent the welding surface from contacting the pressing surface; and passing a workpiece between the welding surface and the pressing surface.

23. The method of claim 22 and further comprising:

utilizing a second linkage structure between a second mounting surface on the ultrasonic horn and a second bearer surface on the anvil to prevent the welding surface from contacting the pressing surface.

24. The method of claim 23 and further comprising:

varying a separation distance between the welding surface and the pressing surface by adjusting the length of the first linkage structure.

* * * * *

UNITED STATES PATENT AND TRADEMARK OFFICE
CERTIFICATE OF CORRECTION

PATENT NO. : 6,634,539 B2
DATED : October 21, 2003
INVENTOR(S) : Mlinar et al.

It is certified that error appears in the above-identified patent and that said Letters Patent is hereby corrected as shown below:

Column 9,
Line 62, delete "Claim 12" and insert -- Claim 10 --.

Column 10,
Line 14, after "the" delete "axially extending".
Line 47, delete "predetermined" and insert -- pre-determined --.

Signed and Sealed this

Twenty-sixth Day of July, 2005

JON W. DUDAS
*Director of the United States Patent and Trademark Office*